(12) United States Patent
Rosplock et al.

(10) Patent No.: US 9,709,080 B2
(45) Date of Patent: Jul. 18, 2017

(54) VARIABLE COOLING FLOW

(71) Applicant: Woodward, Inc., Fort Collins, CO (US)

(72) Inventors: James D. Rosplock, Roscoe, IL (US); Christopher J. Leeson, Machesney Park, IL (US)

(73) Assignee: Woodward, Inc., Fort Collins, CO (US)

( * ) Notice: Subject to any disclaimer, the term of this patent is extended or adjusted under 35 U.S.C. 154(b) by 587 days.

(21) Appl. No.: 14/178,831

(22) Filed: Feb. 12, 2014

(65) Prior Publication Data
US 2015/0226237 A1    Aug. 13, 2015

(51) Int. Cl.
| | | |
|---|---|---|
| *F15B 15/02* | (2006.01) | |
| *F16K 31/12* | (2006.01) | |
| *F15B 15/14* | (2006.01) | |
| *F15B 15/12* | (2006.01) | |
| *F16K 11/052* | (2006.01) | |

(52) U.S. Cl.
CPC .......... *F15B 15/1485* (2013.01); *F15B 15/12* (2013.01); *F15B 15/149* (2013.01); *F16K 11/0525* (2013.01)

(58) Field of Classification Search
CPC .... F15B 15/1485; F15B 15/12; F15B 15/149; F15B 15/202; F15B 15/24; F15B 21/044; B60G 21/0555; F16F 9/43
USPC ..... 92/12.1, 121, 261, 399, 400, 401; 91/25, 91/408, 443
See application file for complete search history.

(56) References Cited

U.S. PATENT DOCUMENTS

| | | | |
|---|---|---|---|
| 2,404,262 A | * | 7/1946 | Whitfield ............... F15B 15/12 60/631 |
| 2,735,406 A | * | 2/1956 | Britton ..................... F15B 9/10 91/210 |
| 3,053,236 A | | 9/1962 | Self et al. |

(Continued)

FOREIGN PATENT DOCUMENTS

| | | |
|---|---|---|
| DE | 2515716 | 10/1976 |
| DE | 10004881 | 8/2001 |
| DE | 102011078936 | 1/2013 |

OTHER PUBLICATIONS

PCT International Search Report and Written Opinion of the International Searching Authority, PCT/US2015/015460, May 28, 2015, 17 pages.

(Continued)

*Primary Examiner* — F. Daniel Lopez
*Assistant Examiner* — Richard Drake
(74) *Attorney, Agent, or Firm* — Fish & Richardson P.C.

(57) ABSTRACT

The subject matter of this specification can be embodied in, among other things, a rotary vane actuator that includes a stator having at least one vane stop and a rotor having vanes projecting from a central shaft. The vane is adapted to contact said stop of the stator, and a high pressure chamber is defined by the stator and a first side of the vane and a low pressure chamber on a second side of the vane. The actuator further includes at least a first aperture connected to the high pressure chamber a second aperture connected to the low pressure chamber. A fluid flow passage connects the first aperture in the high pressure chamber to the second aperture in the low pressure chamber.

10 Claims, 7 Drawing Sheets

(56) References Cited

U.S. PATENT DOCUMENTS

| | | | | |
|---|---|---|---|---|
| 3,253,515 | A | * | 5/1966 | Wilkinson ............ F15B 21/041 91/401 |
| 3,327,592 | A | * | 6/1967 | Wilkinson .......... F16K 11/0525 417/242 |
| 3,696,713 | A | * | 10/1972 | Ragard ................... F15B 15/12 91/357 |
| 3,832,852 | A | * | 9/1974 | Schmucker ............. F15B 7/003 60/546 |
| 4,009,639 | A | * | 3/1977 | Sabashi ................... F15B 15/12 91/25 |
| 5,248,015 | A | | 9/1993 | Yoshioka et al. |
| 5,983,782 | A | | 11/1999 | Lebrun et al. |
| 6,237,466 | B1 | | 5/2001 | Fukuhara et al. |
| 6,412,463 | B1 | | 7/2002 | Kinugawa |

OTHER PUBLICATIONS

PCT International Preliminary Report on Patentability, PCT/US/2015/015460, Aug. 25, 2016, 13 pages.

* cited by examiner

VARIABLE COOLING FLOW

TECHNICAL FIELD

This invention relates to an actuator device and more particularly to a pressurized hydraulic rotary actuator device wherein a cooling fluid flow path is provided between high and low pressure chambers.

BACKGROUND

Rotary actuators are used as part of some mechanical devices, to deliver rotary motion in an efficient manner. Rotary actuators are desirable because they maintain constant torque and conserve space. Such prior art rotary actuators typically include multiple subcomponents such as a rotor and two or more stator housing components.

Variable geometry on aircraft engines can be positioned by rotary actuators that use jet fuel as the working fluid. The on-engine environment can be very hot. Actuators used in such applications can have cooling orifices that allow a limited flow of fuel through the actuator and the flow of fuel can remove heat, lowering the actuator temperature. Relatively larger fluid pumps, with their associated higher weights and costs, can be implemented to provide such cooling flow, and such cooling flow can contribute to sluggish and/or imprecise position control.

SUMMARY

In general, this document describes rotary actuators that include controllable cooling fluid flows.

In a first aspect, a rotary vane actuator includes a stator having at least one vane stop projecting from an inner circumferential surface of a central chamber of the stator, and a rotor having at least one vane projecting from a central rotatable longitudinal shaft, said rotor rotatably disposed in the stator, said vane including a sealing element disposed on a distal end of the vane and said sealing element adapted to contact the inner circumferential surface of the stator. The vane is adapted to contact said stop of the stator, and a high pressure chamber is defined by the stator and a first side of the vane and a low pressure chamber is defined by the stator and a second side of the vane. The actuator further includes at least a first aperture connected to the high pressure chamber a second aperture connected to the low pressure chamber. A fluid flow passage connects the first aperture in the high pressure chamber to the second aperture in the low pressure chamber.

Various embodiments can include some, all, or none of the following features. The fluid flow passage can be a gap between an outer surface of the stator and a housing of the actuator. The fluid flow passage can be a groove in an outer surface of the stator. The fluid flow passage can be a groove in an inner surface of the housing adjacent to the stator. The fluid flow passage can be a groove in the central rotatable longitudinal shaft adjacent to the vane. The fluid flow passage can be a bore in the stator. The fluid flow passage can be a bore in the housing. The fluid flow passage can be an external flow passage. The fluid flow passage can include a gap between the distal end of the rotary vane and the inner circumferential wall of the stator. The fluid flow passage can include a gap in the stator wall and the sealing element.

In a second aspect, a method of cooling fluid flow for a rotary vane actuator includes providing a stator having at least one stator vane projecting from an inner circumferential surface of a central chamber of the stator. A rotor is provided, the rotor having at least one rotor vane projecting from a central rotatable longitudinal shaft, said rotor rotatably disposed in the stator, said rotor vane including a sealing element disposed on a distal end of the rotor vane. The method also includes contacting the inner circumferential surface of the stator with the sealing element at a third circumferential location between the first circumferential location and the second circumferential location, defining a first fluid chamber with the stator, the sealing element, and a first side of the rotor vane, defining a second fluid chamber with the stator, the sealing element, and a second side of the rotor vane, defining a first aperture at a first location, and a second aperture at a second location different from the first circumferential location and in fluidic communication with the first aperture, and flowing a fluid from the first fluid chamber through the first aperture to the second aperture to the second fluid chamber.

Various embodiments can include some, all, or none of the following features. The method can also include rotating the rotor, contacting the inner circumferential surface of the stator with the sealing element at a fourth circumferential location not between the first circumferential location and the second circumferential location, and stopping the fluid from flowing through the first aperture and the second aperture. Fluidic communication between the first aperture and the second aperture can be provided by a fluid flow passage comprising a gap between an outer surface of the stator and a housing of the actuator. Fluidic communication between the first aperture and the second aperture can be provided by a fluid flow passage comprising a groove in an outer surface of the stator. Fluidic communication between the first aperture and the second aperture can be provided by a fluid flow passage comprising a groove in an inner surface of the housing adjacent to the stator. Fluidic communication between the first aperture and the second aperture can be provided by a fluid flow passage comprising a groove in the central rotatable longitudinal shaft adjacent to the vane. Fluidic communication between the first aperture and the second aperture can be provided by a fluid flow passage comprising a bore in the stator. Fluidic communication between the first aperture and the second aperture can be provided by a fluid flow passage comprising a bore in the housing. Fluidic communication between the first aperture and the second aperture can be provided by a fluid flow passage comprising an external flow passage. Fluidic communication between the first aperture and the second aperture can be provided by a fluid flow passage comprising a gap between the distal end of the rotary vane and the inner circumferential wall of the stator. Fluidic communication between the first aperture and the second aperture can be provided by a fluid flow passage comprising a gap in the stator wall and the sealing element In a third aspect, a rotary vane actuator includes a stator having at least one stator vane projecting from an inner circumferential surface of a central chamber of the stator, and a stator sealing element disposed on a distal end of the stator vane. The rotary actuator also includes a rotor having a central rotatable longitudinal shaft rotatably disposed in the stator and rotatable between at least a first rotary position and a second rotary position, at least one rotor vane projecting from the central rotatable longitudinal shaft, a rotor vane sealing element disposed on a distal end of the rotor vane and adapted to contact the inner circumferential surface of the stator. The rotary actuator also includes a first aperture, a second aperture, and a fluid path in fluidic communication between the first aperture and spaced apart circumferentially from the first aperture. The rotor vane sealing element is adapted to contact said central rotatable longitudinal shaft, and a first fluid chamber is defined by the stator, a first side of the stator vane, a first side of the rotor vane, the stator sealing element, and the rotor sealing element, and a second fluid chamber is defined by the stator, a second side of the stator vane, a second side of the rotor vane, the stator sealing element, and the rotor sealing element. The first aperture and the second aperture are both in fluidic communication with the first fluid chamber or the second fluid chamber when the central rotatable longitudinal shaft is in the first rotary position, and the first aperture is in fluidic communication with the first fluid chamber and the second aperture is in fluidic communication with the second chamber when the central rotatable longitudinal shaft is in the second rotary position.

The systems and techniques described here may provide one or more of the following advantages. First, a system can provide cooling flow to remove heat from an actuator when needed, and remove cooling flow when accurate position control is needed.

The details of one or more implementations are set forth in the accompanying drawings and the description below. Other features and advantages will be apparent from the description and drawings, and from the claims.

DETAILED DESCRIPTION

This document describes examples of hydraulic blocking rotary actuators with variable cooling flow. In general, the actuators include a fluid flow path that can be controllably deactivated. Such control can be obtained by providing a path that fluidically connects and provides a flow path between a high pressure chamber to a low pressure chamber while a rotor of the rotary actuator is within a predetermined rotational position range, and prevents fluid flow when the rotor is outside the predetermined rotational position range. When such cooling flows can be blocked when not needed, the sizes of associated fluid pumps can be reduced and/or dead band effects within the rotary actuator can be reduced.

Figure 1:
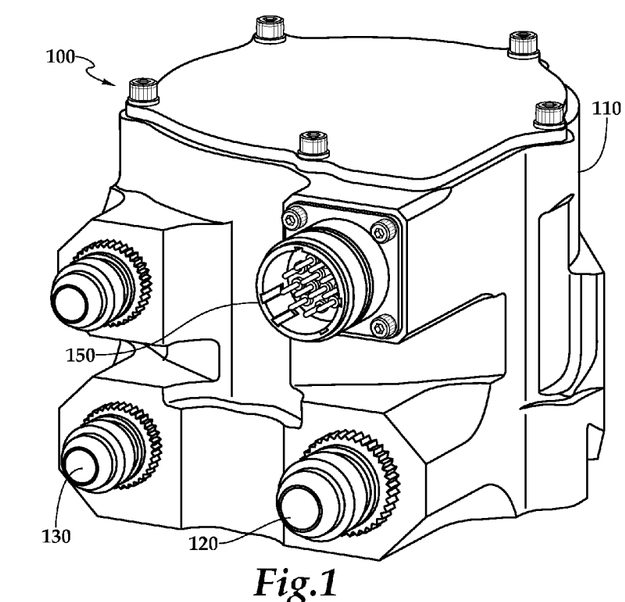
FIG. 1 is a perspective view of an example rotary actuator with variable cooling flow.

FIG. 1 is a perspective view of an example rotary actuator 100 with variable cooling flow. The actuator 100 includes a housing 110. The housing 100 includes various components that are not visible in this view but will be discussed in the descriptions of FIGS. 2-12.

The housing 110 includes a fluid port 120 and a fluid port 130. The fluid ports 120, 130 are in fluid communication with fluid chambers (not visible in this view). For example, pressurized fluid such as hydraulic fluid, air, fuel, or any other appropriate fluid can be applied to the fluid port 120 to cause the actuator 100 to actuate in a first direction. In another example, pressurized fluid can be applied to the fluid port 130 to cause the actuator 100 to actuate in the opposite direction. As will be discussed in the descriptions of FIGS. 4-12, under predetermined actuations of the actuator 100 the fluid ports 120 and 130

A connector 150 includes a collection of connection points in communication with various electrical, mechanical, fluidic, or optical circuits (e.g., controls, sensors) within the housing 100. In use, external devices may be connected to the connector 150 to be placed in communication with the circuits (e.g., for purposes of control or position feedback).

Figure 2:
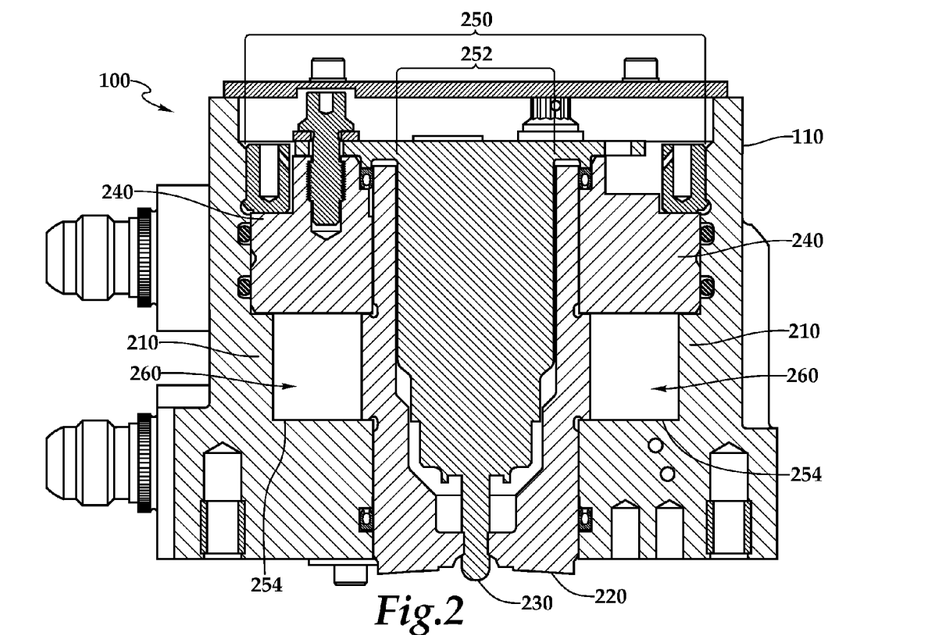
FIG. 2 is a cross sectional side view of an example rotary actuator with variable cooling flow.

FIG. 2 is a cross sectional side view of the example rotary actuator 100 of FIG. 1. In the view provided by FIG. 2 the actuator 100 includes, among other components, a stator assembly 210, a rotor assembly 220, a spline 230 located concentrically within a cavity 252, and a rotor cap 240.

The stator assembly 210 is a substantially ring-shaped structure, the outer diameter of which contacts the inner surface of a cavity 250 formed within the housing 110. The rotor assembly 220 is located concentrically within the stator assembly 210, and the rotor cap 240 is located concentrically within the stator assembly 210 to secure the stator assembly 210 against a lower axial surface 254 of the cavity 250. In their assembled form, the stator assembly 210, the rotor cap 240, and the lower axial surface 254 of the housing 110 form a collection of fluid chambers 260.

Figure 3:
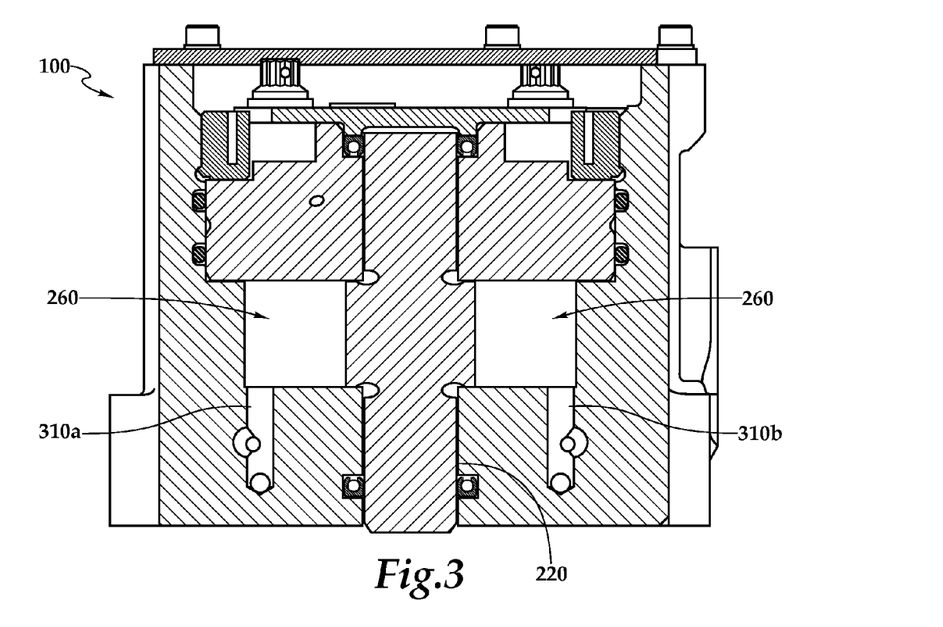
FIG. 3 is another cross sectional side view of an example rotary actuator with variable cooling flow.

FIG. 3 is another cross sectional side view of the example rotary actuator 100 of FIG. 1. In the view provided by FIG. 3, the fluid chambers 260 are in fluid communication with a fluid duct 310a and a fluid duct 310b. The fluid duct 310a is in fluid communication with the fluid port 120 of FIG. 1, and the fluid duct 310b is in fluid communication with the fluid port 130.

Figure 4A:
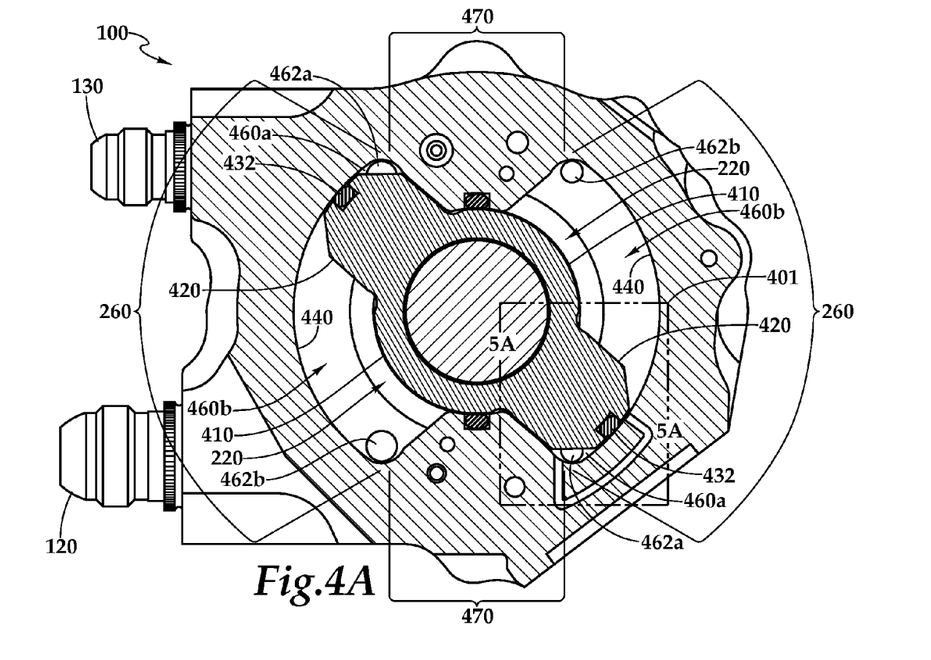
FIG. 4A is a cross sectional top view of an example rotary actuator with variable cooling flow and a rotor assembly shown in a clockwise rotational position.
Figure 4B:
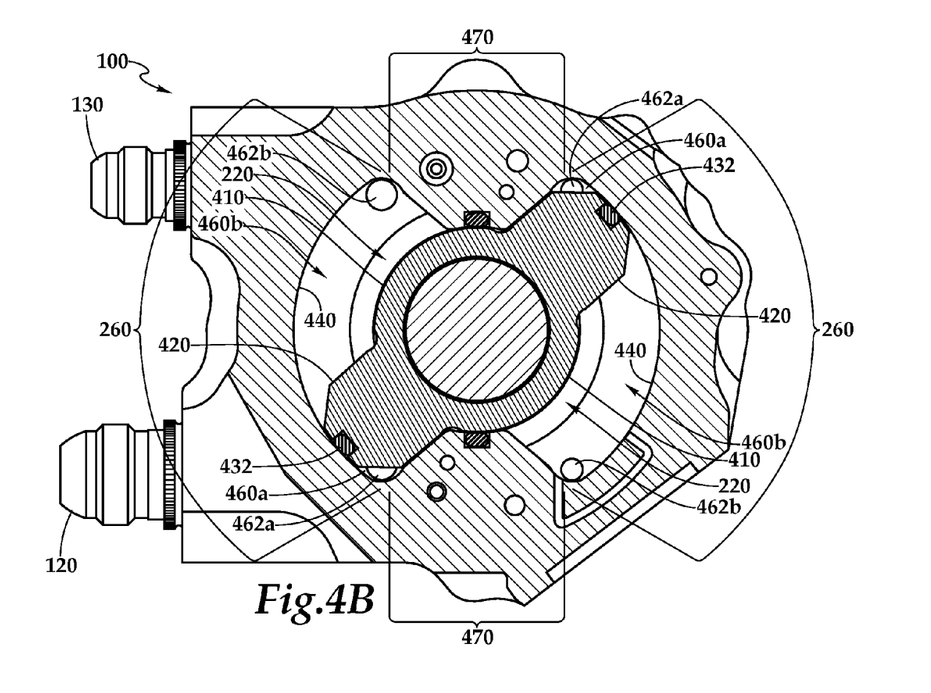
FIG. 4B is a cross sectional top view of an example rotary actuator with variable cooling flow and a rotor assembly shown in a counterclockwise rotational position.

FIGS. 4A-4B are a cross sectional top views of the example rotary actuator 100 of FIG. 1 with the rotor assembly 220 shown in various rotary orientations of an example actuation. Referring to FIG. 4A, the example rotary actuator 100 is shown with the rotor assembly 220 in a clockwise rotational position. The rotor assembly 220 includes a rotor 410 and a pair of rotor vanes 420. Each of the rotor vanes 420 includes a seal 432. The seals 432 contact an inner wall 440 of the fluid chambers 260 of the stator assembly 210, to subdivide the fluid chambers 260 into a first pair of fluid chambers 460a and a second pair of fluid chambers 460b.

Each fluid chamber 460a includes a fluid port 462a, and each fluid chamber 460b includes a fluid port 462b. The fluid ports 462a are in fluid communication with the fluid port 120, e.g., through the fluid duct 310a, and the fluid ports 462b are in fluid communication with the fluid port 130, e.g., through the fluid duct 310b. Pressurized fluid can be applied to the fluid port 120 to pressurize the fluid chambers 460*a* and urge the rotor assembly 220 to rotate counter-clockwise. Fluids in the fluid chambers 460*b* are urged out the fluid ports 462*b* to the fluid port 130.

Counter-clockwise rotation of the rotor assembly may continue until the rotor vanes 420 contact a pair of stator vanes 470 that extend radially inward from the inner wall 440. FIG. 4B shows a cross sectional top view of the example rotary actuator 100 with the rotor assembly 220 shown in an example fully counter-clockwise rotational position.

Pressurized fluid can be applied to the fluid port 130 to pressurize the fluid chambers 460*b* and urge the rotor assembly 220 to rotate clockwise. Fluids in the fluid chambers 460*a* are urged out the fluid ports 462*a* to the fluid port 120. Clockwise rotation of the rotor assembly 220 may continue until the rotor vanes 420 contact stator vanes 470 that extend radially inward from the inner wall 440, returning the actuator 100 to the example state shown in FIG. 4A.

In some implementations, the actuator 100 may be located in a hot environment, such as near an operating engine or within a hot engine compartment. In such examples, heat from the environment may elevate the temperature of the various components of the actuator 100, which in turn may heat the fluid used to actuate the actuator 100. During clockwise and counter-clockwise movement of the rotor assembly 220, heated fluid in the fluid chambers 460*a* and 460*b* may be exchanged for cooler fluid through the fluid ports 462*a* and 462*b*.

In some implementations, however, the rotor assembly 220 may be held in a selected position, such as the fully clockwise hard-stopped position shown in FIG. 4A or the fully counter-clockwise hard-stopped position shown in FIG. 4B, for extended periods of time. In such examples, the fluid in the fluid chambers 460*a* and 460*b* may have adequate time to absorb a considerable amount of heat from the actuator 100. In some examples, the actuating fluid may be sensitive to temperature (e.g., fuel), and as such one or more structures for providing a cooling flow of fluid through the actuator can be implemented. Examples of structures are discussed in the descriptions of FIGS. 5A-9.

Figure 5A:
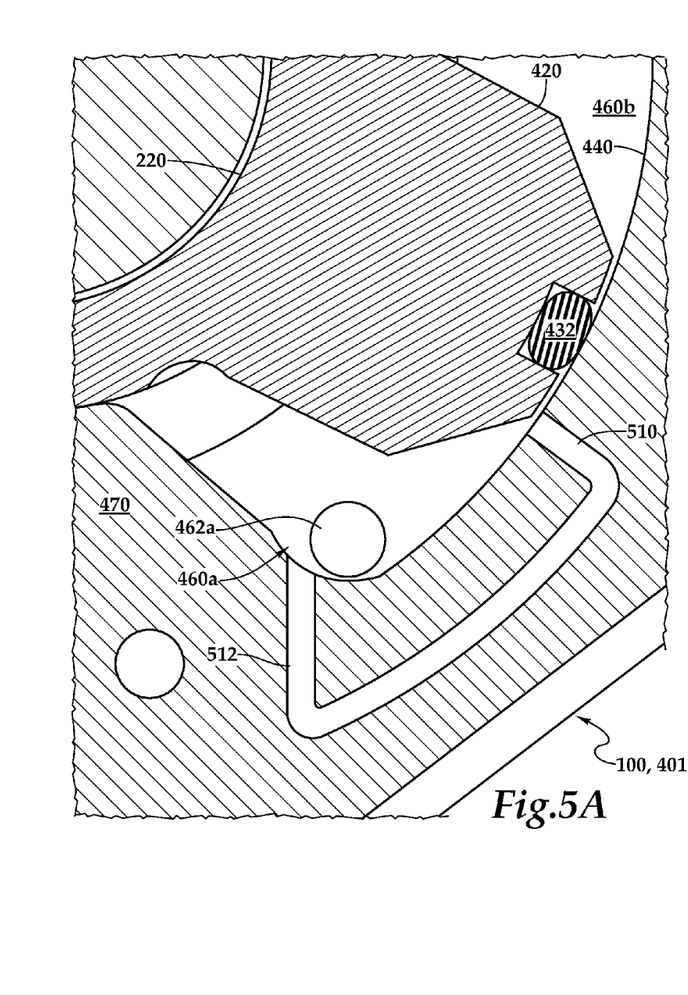
FIGS. 5A and 5B are enlarged cross sectional top views of a rotary actuator with an example variable cooling flow.
Figure 5B:
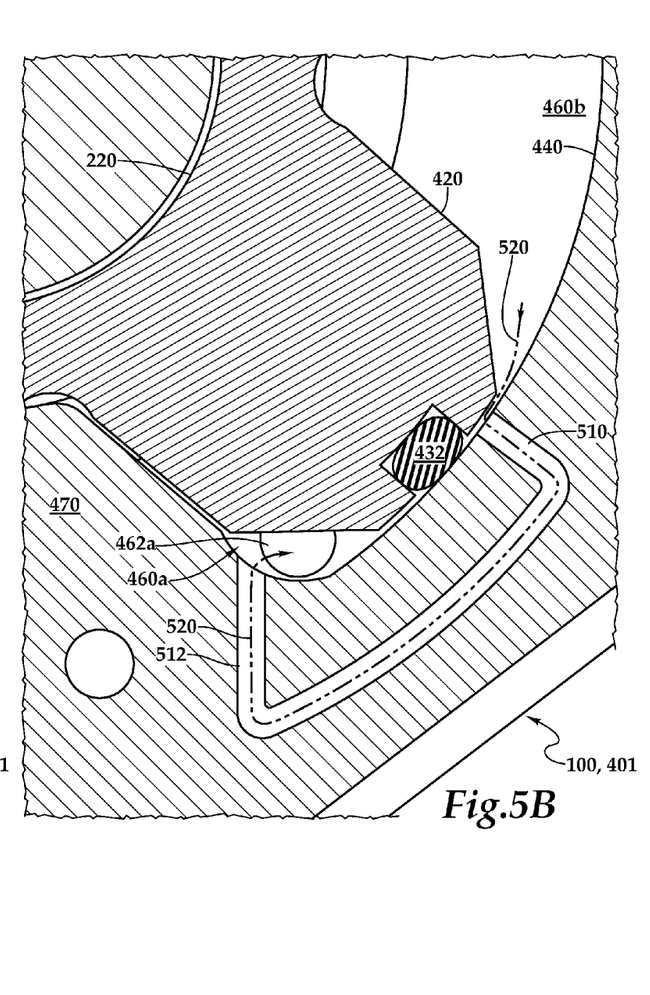

FIGS. 5A and 5B are enlarged views of a region designated as 401 in FIG. 4A. Referring to FIG. 5A, the rotor assembly 220 is shown in a position that is less than fully clockwise, e.g., the rotor vane 420 is not in hard-stop contact with the stator vane 470. In this example, the rotor assembly 220 is being rotated toward the fully clockwise position. As discussed previously, the rotor assembly 220 is urged clockwise by flowing fluid into the fluid chamber 460*b* while allowing fluid in the fluid chamber 460*a* to escape out the fluid port 462*a*.

In the enlarged views of FIGS. 5A and 5B, it can be seen that the stator assembly 210 includes a cooling port 510 and a cooling port 512. The cooling port 510 is a fluid port in fluid communication with the cooling port 512 through a cooling channel 514 formed about the outer periphery of the stator assembly 470. In some embodiments, cooling ports such as the cooling ports 510, 512 can be fluidly connected through cooling channels formed about or bored through the stator assembly 470, formed upon or bored through the housing 110, formed as ductwork connected to the cooling ports, or as combinations of these and any other appropriate form of fluid flow paths.

Referring to FIG. 5B, the cooling port 512 is located near the fluid port 462*a* such that cooling port 512 and the fluid port 462*a* are in fluid communication regardless of the rotary position of the rotor assembly 220. The cooling port 510 is located along the inner wall 440 at a position that is opposite the seal 432 when the rotor assembly 220 is at a fully clockwise rotational orientation.

Referring back to FIG. 5A, the rotor assembly 220 is in a rotational orientation that causes the cooling port 510 and the cooling port 512 to be on the same side of the seal 432. In the illustrated configuration, both of the cooling ports 510, 512 are in fluid communication with the fluid chamber 610*a*. Since the cooling port 510 and the cooling port 512 are at the same pressure, no fluid flows along the cooling path 514.

Referring again to FIG. 5B, the rotor assembly 220 is in a rotational orientation that causes the cooling port 510 and the cooling port 512 to be on opposite sides of the seal 432. In the illustrated configuration, the cooling port 510 is fluidly connected to the fluid chamber 460*b* and the cooling port 512 is fluidly connected to the fluid chamber 460*a*. As pressure in the fluid chamber 460*b* is maintained, e.g., to hold the rotor assembly 220 at the clockwise hard-stop orientation, a small cooling leakage flow of fluid follows a path generally indicated as 520, which flows from the fluid chamber 460*b* out the cooling port 510, through the cooling path 514, through the cooling port 512 into the fluid chamber 460*a*, and out the fluid port 462*a*.

By providing the small cooling leakage flow, heated fluid in the fluid chamber 460*b* may be allowed to escape the fluid chamber 460*b* and be replaced by a small flow of cooler fluid entering through the fluid ports 462*b* (not shown in this view) when the seal 432 is within a predetermined rotational distance of a hard stop, as defined by the location of the cooling port 510.

However, when the rotor assembly is in various rotational positions that place the seal 432 beyond the predetermined rotational distance defined by the location of the cooling port 510, such as the position shown in FIG. 5A, no leakage flow occurs between the cooling ports 510, 512, removing the corresponding need to provide a cooling leakage flow to compensate for the leakage. In some embodiments, by only providing the cooling leakage flow when the actuator 100 is in predetermined positions, the cooling leakage flow can be provided for configurations where it is most beneficial, and prevented for rotational configurations where leakage may cause undesirable side effects, e.g., "soft" response or reduced positional holding capability of the actuator 100.

Although in the examples shown in FIGS. 5A and 5B the cooling path 514 is shown and described as being located proximate one clockwise hard stop, in other embodiments one or more cooling paths may be located at one or more other locations along the inner wall 440. For example, a cooling path may be provided at one or both of the clockwise hard stop locations, one or both of the counter-clockwise hard stop locations, or any appropriate combination of these.

Figure 6A:
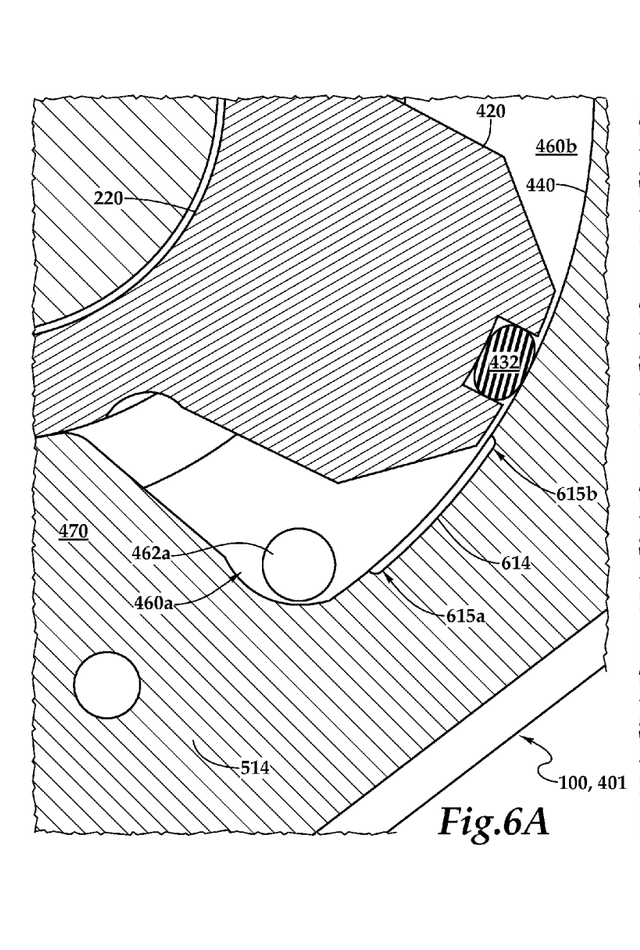
FIGS. 6A and 6B are enlarged cross sectional top views of a rotary actuator with another example variable cooling flow.
Figure 6B:
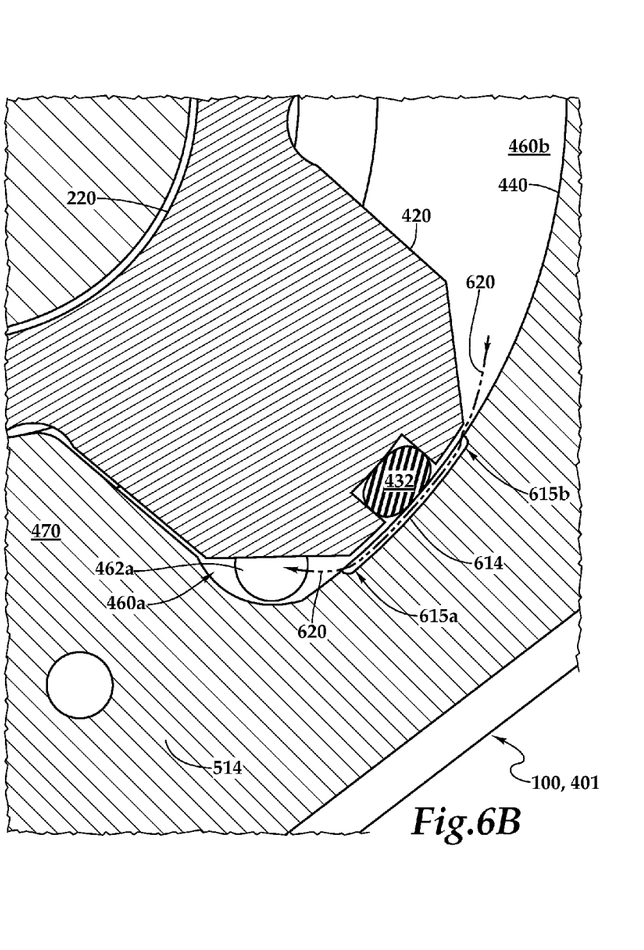

FIGS. 6A and 6B are enlarged views of another example variable cooling flow. In some embodiments, then configuration shown in FIGS. 6A and 6B can be used in place of the configuration illustrated in region designated as 401 in FIGS. 4A and 4B. In the present example, a cooling channel 614 that performs substantially the same function as the cooling path 514, and an end 615*a* and an end 615*b* that perform substantially the same function as in the cooling ports 510, 512 in the example shown in FIGS. 5A and 5B.

The cooling channel 614 is a groove formed circumferentially along a predetermined portion of the inner wall 440. The length and position of the cooling channel 614 are selected such that both ends 615*a*, 615*b* of the cooling channel 614 are both on one side of the seal 432 when the rotor vane 420 is rotated at least a predetermined distance from the stator vane 470, as shown in FIG. 6A, and such that the cooling channel 614 extends beyond both sides of the seal 432 when the rotor assembly 220 rotates the rotor vane 420 within a predefined arc, as shown in FIG. 6B. In some implementations, the cooling channel 614 can be located along the inner wall 440 such that the ends 615a, 615b of the cooling channel 614 extend beyond both sides of the seal 432 when the rotor assembly 220 is at or near a hard stop position, such as when the rotor vane 440 contacts the stator vane 470.

Referring to FIG. 6A, the rotor assembly 220 is in a rotational orientation that causes the entire length of the cooling channel 614 to be on one side of the seal 432. In the illustrated configuration, the entire length of the cooling channel 614 is in fluid communication with the fluid chamber 460a. Since the entire length of the cooling channel 614 is at the same pressure, no fluid flows along the cooling channel 514.

Referring now to FIG. 6B, the rotor assembly 220 is in a rotational orientation that causes the ends 615a, 615b of the cooling channel 614 to extend beyond opposite sides of the seal 432. The cooling channel 614 is formed with an axial width that is sufficiently narrow so as to prevent the seal 432 from extending into the cooling channel 614 and sealing it. In the illustrated configuration, the end 615b is exposed to the fluid chamber 460b and the end 615a is exposed to the fluid chamber 460a. As pressure in the fluid chamber 460b is maintained, e.g., to hold the rotor assembly 220 at the clockwise hard-stop orientation, a small cooling leakage flow of fluid follows a path generally indicated as 620, which flows from the fluid chamber 460b into the end 615b, through the cooling channel 614, through the end 615a into the fluid chamber 460a, and out the fluid port 462a.

By providing the small cooling leakage flow, heated fluid in the fluid chamber 460b may be allowed to escape the fluid chamber 460b and be replaced by a small flow of cooler fluid entering through the fluid ports 462b (not shown in this view) when the seal 432 is within a predetermined rotational distance of a hard stop, as defined by the location of the cooling channel 610.

Although in the examples shown in FIGS. 6A and 6B the cooling channel 614 is shown and described as being located proximate one clockwise hard stop, in other embodiments one or more cooling channels may be located at one or more other locations along the inner wall 440. For example, a cooling channel may be provided at one or both of the clockwise hard stop locations, one or both of the counterclockwise hard stop locations, or any appropriate combination of these.

Although in the examples shown in FIGS. 6A and 6B the cooling channel 614 is shown and described as being formed in the inner wall 440, in other embodiments one or more cooling channels may be formed in other surfaces of the fluid chambers 260. For example, a cooling channel may be formed as a groove in the inner axial wall 254 (not shown in this view) or as a groove in a surface of the rotor cap 240 that forms a longitudinal side wall of the fluid chambers 260.

Figure 7:
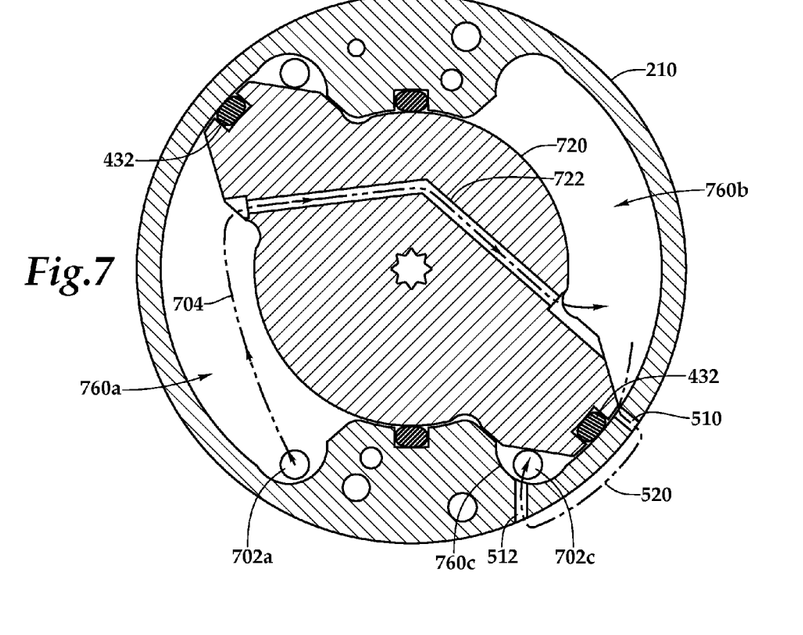
FIG. 7 is a cross sectional top view of another example rotor assembly that can be used in a rotary actuator with variable cooling flow.

FIG. 7 is a cross sectional top view of an example rotor assembly 720 that can be used in conjunction with another rotary actuator with variable cooling flow. In some embodiments, the rotor assembly 720 can be used in place of the rotor assembly 220 of FIGS. 2-6B.

The rotor assembly 720 includes a fluid duct 722 that fluidly connects a fluid chamber 760a and a fluid chamber 760b. In the illustrated example, when the seal 432 is rotated into a location between the cooling port 510 and the cooling port 512, a cooling flow of fluid is possible.

In the illustrated configuration, pressurized fluid is provided to the fluid chamber 760a though a fluid port 702a. A small cooling leakage flow of fluid follows a path generally indicated as 704 through the fluid chamber 760a to the fluid duct 722, and through the fluid duct 722 into the fluid chamber 760b. A small cooling leakage flow of fluid in the fluid chamber 760b follows the path generally indicated as 520, which flows from the fluid chamber 760b out the cooling port 510 to the cooling port 512 into a fluid chamber 760c, and out a fluid port 702c.

By providing the small cooling leakage flow, heated fluid in the fluid chambers 760a-760c may be allowed to escape and be replaced by a small flow of cooler fluid entering through the fluid port 702a when the seal 432 is within a predetermined rotational distance of a hard stop, as defined by the location of the cooling port 510.

Figure 8:
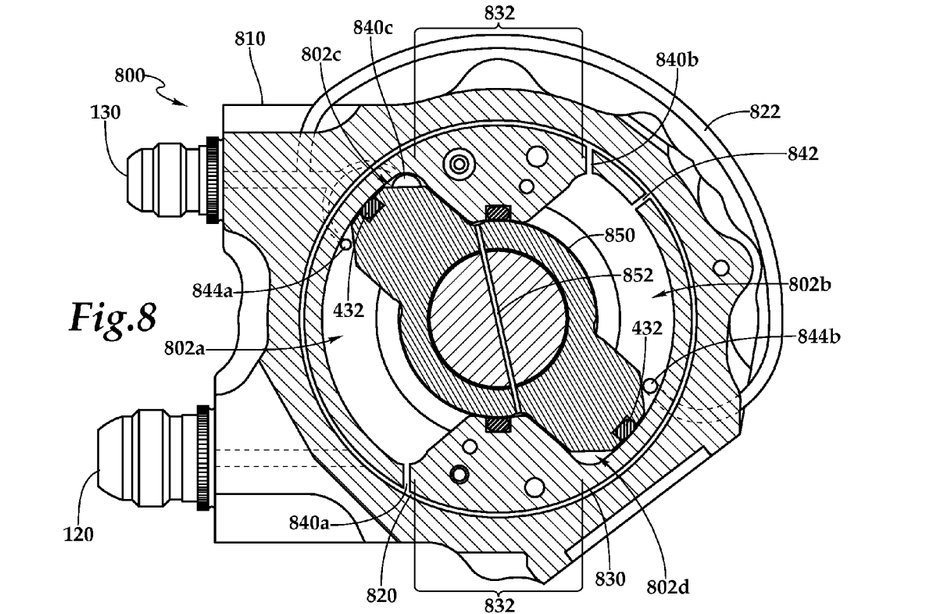
FIG. 8 is a cross sectional top view of another rotary actuator with variable cooling flow.

FIG. 8 is a cross sectional top view of another rotary actuator 800 with variable cooling flow. The actuator includes a housing 810. The housing 810 includes the fluid port 120 and the fluid port 130. The fluid port 120 is in fluid communication with a fluid channel 820 formed in a space provided between the housing 810 and a stator assembly 830. The stator assembly 830 includes a pair of stator vanes 832. The fluid channel 820 fluidically connects the fluid port 120 to a fluid port 840a and a fluid port 840b, as well as a cooling port 842. The fluid port 130 is in fluid communication with a fluid duct 822. The fluid duct 822 fluidically connects the fluid port 130 to a fluid port 840c, a cooling port 844a, and a cooling port 844b. The cooling ports 844a and 844b have relatively small orifices that are relatively more restrictive to fluid flow compared to the fluid port 840c. A flow applied to the fluid duct 822 will flow primarily to the fluid port 840c, and allow only a relatively smaller leakage flow through the cooling ports 844a, 844b. Similarly, the cooling port 842 is relatively more restrictive than the fluid ports 840a, 840b.

A rotor assembly 850 includes a fluid duct 852 that fluidically connects a fluid chamber 802c with a fluid chamber 802d. Pressurized fluid is applied at the fluid port 120 and flows to the fluid ports 840a and 840b to urge rotation of the rotor assembly 850 in a clockwise direction. As shown in the illustration of the present example, the rotor assembly 850 eventually reaches a clockwise hard stop rotational position.

In the illustrated rotational configuration of the rotor assembly 850, pressurized fluid can continue to be applied at the fluid port 120 to urge heated fluid in the fluid chamber 802a out the cooling port 844a, and to urge heated fluid in the chamber 802b out the cooling port 844b.

When application of fluid at the fluid port 120 is stopped and fluid is applied at the fluid port 130 instead, the fluid flows to the fluid port 840c to enter a fluid chamber 802c. The flow of fluid into the fluid chamber 802c urges rotation of the rotor assembly 850 in a counter-clockwise direction. Fluid from the fluid chamber 802c flows through the fluid duct 852 to the fluid chamber 802d to further urge rotation of the rotor assembly 850 in a counter-clockwise direction.

The rotor assembly 850 eventually reaches a counter clockwise hard stop rotational position in which the seals 432 are positioned between the cooling port 842 and the proximal stator vane 832. Fluid in the fluid chamber 802c is urged through the fluid duct 852, and through the fluid chamber 802d to the cooling port 842. The fluid flows from the cooling port 842, along the fluid duct 820, and out the fluid port 120.

Figure 9:
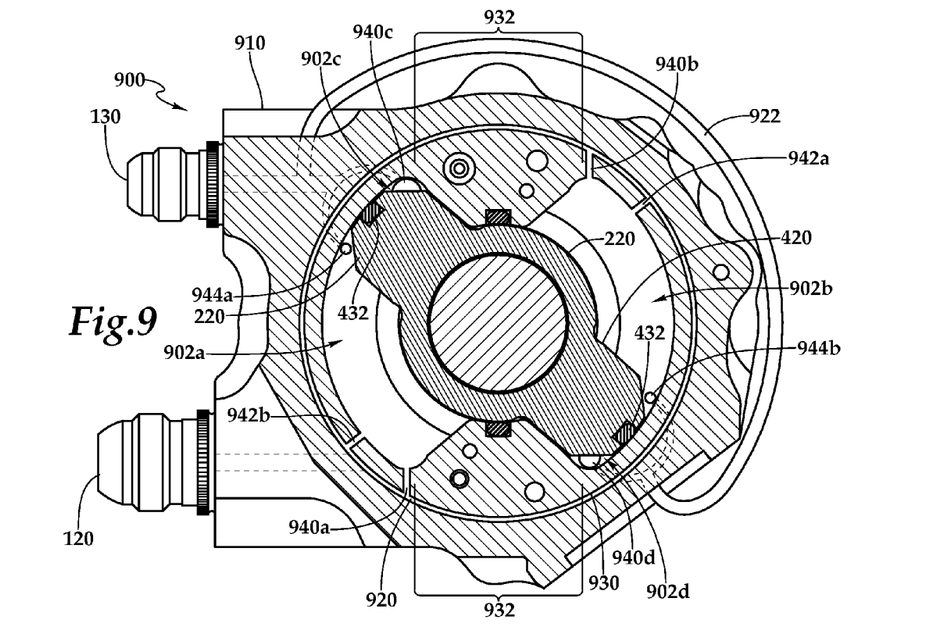
FIG. 9 is a cross sectional top view of another rotary actuator with variable cooling flow.

FIG. 9 is a cross sectional top view of another rotary actuator 900 with variable cooling flow. The actuator includes a housing 910. The housing 910 includes the fluid port 120 and the fluid port 130. The fluid port 120 is in fluid communication with a fluid channel 920 formed in a space provided between the housing 910 and a stator assembly 930. The stator assembly 930 includes a pair of stator vanes 932. The fluid channel 920 fluidically connects the fluid port 120 to a fluid port 940a and a fluid port 940b, as well as a cooling port 942a and a cooling port 942b. The fluid port 130 is in fluid communication with a fluid duct 922. The fluid duct 922 fluidically connects the fluid port 130 to a fluid port 940c and a fluid port 940d, as well as a cooling port 944a and a cooling port 944b. The cooling ports 942a, 942b, 944a, and 944b have relatively small orifices that are relatively more restrictive to fluid flow compared to the fluid ports 940a-940d. A flow applied to the fluid duct 922 will flow primarily to the fluid ports 940c and 940d, and allow only a relatively smaller leakage flow through the cooling ports 944a, 944b. Similarly a flow applied to the fluid channel 920 will flow primarily to the fluid ports 940a and 940b, and allow only a relatively smaller leakage flow through the cooling ports 942a, 942b.

Pressurized fluid is applied at the fluid port 120 and flows to the fluid ports 940a and 940b to urge rotation of the rotor assembly 220 in a clockwise direction. As shown in the illustration of the present example, the rotor assembly 220 eventually reaches a clockwise hard stop rotational position.

In the illustrated rotational configuration of the rotor assembly 220, pressurized fluid can continue to be applied at the fluid port 120 to urge heated fluid in the fluid chamber 902a out the cooling port 944a, and to urge heated fluid in the chamber 902b out the cooling port 944b.

When application of fluid at the fluid port 120 is stopped and fluid is applied at the fluid port 130 instead, the fluid flows to the fluid port 940c to enter a fluid chamber 902c, and the fluid flows to the fluid port 940d to enter a fluid chamber 902d. The flow of fluid into the fluid chambers 902c and 902d urges rotation of the rotor assembly 220 in a counter-clockwise direction.

The rotor assembly 220 eventually reaches a counter clockwise hard stop rotational position in which the seals 432 are positioned between one of the stator vanes 932 and corresponding proximal one of the cooling ports 942a, 942b. Fluid in the fluid chamber 902c is urged through the cooling port 942b 920, and the fluid chamber 902d is urged through the cooling port 942a. The fluid flows from the cooling ports 942a, 942b, along the fluid duct 920, and out the fluid port 120.

Figure 10:
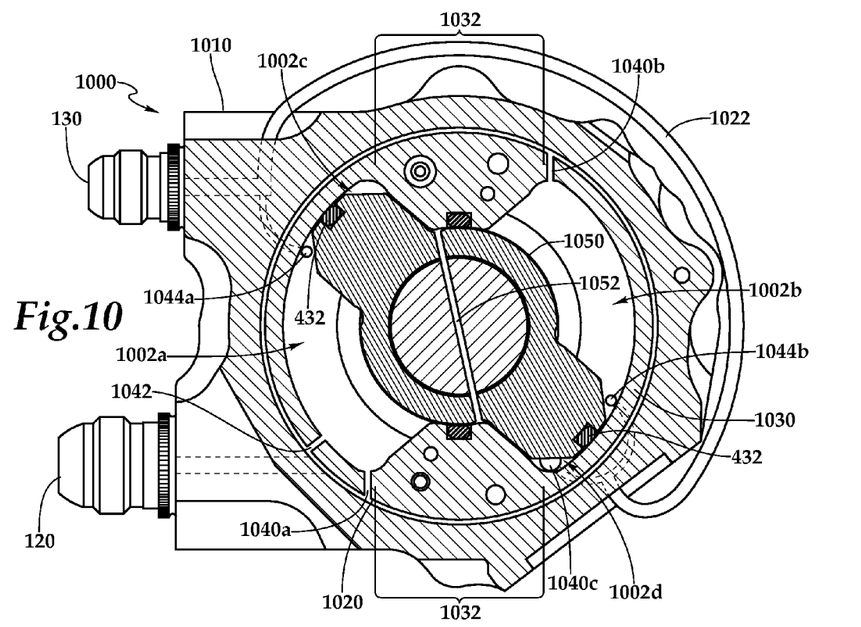
FIG. 10 is a cross sectional top view of another rotary actuator with variable cooling flow.

FIG. 10 is a cross sectional top view of another rotary actuator 1000 with variable cooling flow. The actuator includes a housing 1010. The housing 1010 includes the fluid port 120 and the fluid port 130. The fluid port 120 is in fluid communication with a fluid channel 1020 formed in a space provided between the housing 1010 and a stator assembly 1030. The stator assembly 1030 includes a pair of stator vanes 1032. The fluid channel 1020 fluidically connects the fluid port 120 to a fluid port 1040a and a fluid port 1040b, as well as a cooling port 1042. The fluid port 130 is in fluid communication with a fluid duct 1022. The fluid duct 1022 fluidically connects the fluid port 130 to a fluid port 1040c as well as a cooling port 1044a and a cooling port 1044b. The cooling ports 1044a and 1044b have relatively small orifices that are relatively more restrictive to fluid flow compared to the fluid port 1040c. A flow applied to the fluid duct 1022 will flow primarily to the fluid port 1040c, and allow only a relatively smaller leakage flow through the cooling ports 1044a, 1044b. Similarly, the cooling port 1042 is relatively more restrictive than the fluid ports 1040a, 1040b.

A rotor assembly 1050 includes a fluid duct 1052 that fluidically connects a fluid chamber 1002c with a fluid chamber 1002d. Pressurized fluid is applied at the fluid port 120 and flows to the fluid ports 1040a and 1040b to urge rotation of the rotor assembly 1050 in a clockwise direction. As shown in the illustration of the present example, the rotor assembly 1050 eventually reaches a clockwise hard stop rotational position.

In the illustrated rotational configuration of the rotor assembly 1050, pressurized fluid can continue to be applied at the fluid port 120 to urge heated fluid in the fluid chamber 1002a out the cooling port 1044a, and to urge heated fluid in the chamber 1002b out the cooling port 1044b.

When application of fluid at the fluid port 120 is stopped and fluid is applied at the fluid port 130 instead, the fluid flows to the fluid port 1040c to enter a fluid chamber 1002c. The flow of fluid into the fluid chamber 1002c urges rotation of the rotor assembly 1050 in a counter-clockwise direction. Fluid from the fluid chamber 1002d flows through the fluid duct 1052 to the fluid chamber 1002c to further urge rotation of the rotor assembly 1050 in a counter-clockwise direction.

The rotor assembly 1050 eventually reaches a counter clockwise hard stop rotational position in which one of the seals 432 is positioned between the cooling port 1042 and the proximal stator vane 1032. Fluid in the fluid chamber 1002d is urged through the fluid duct 1052, and through the fluid chamber 1002c to the cooling port 1042. The fluid flows from the cooling port 1042, along the fluid duct 1020, and out the fluid port 120.

In the examples discussed above, the rotary actuators 100, 800, 900, or 1000 each have two pairs of radially opposite but fluidically cooperative fluid chambers. In some embodiments, the rotary actuators may include one, two, three, or more fluid chambers configured to urge rotor assemblies in the clockwise and/or counter-clockwise direction. In some embodiments, fluid ports and cooling ports exposed to the fluid chambers of the rotary actuators 100, 800, 900, or 1000 may be formed as bores through the stator assemblies and/or as bores through the housing, e.g., though the inner axial wall 254 (FIG. 1).

Figure 11:
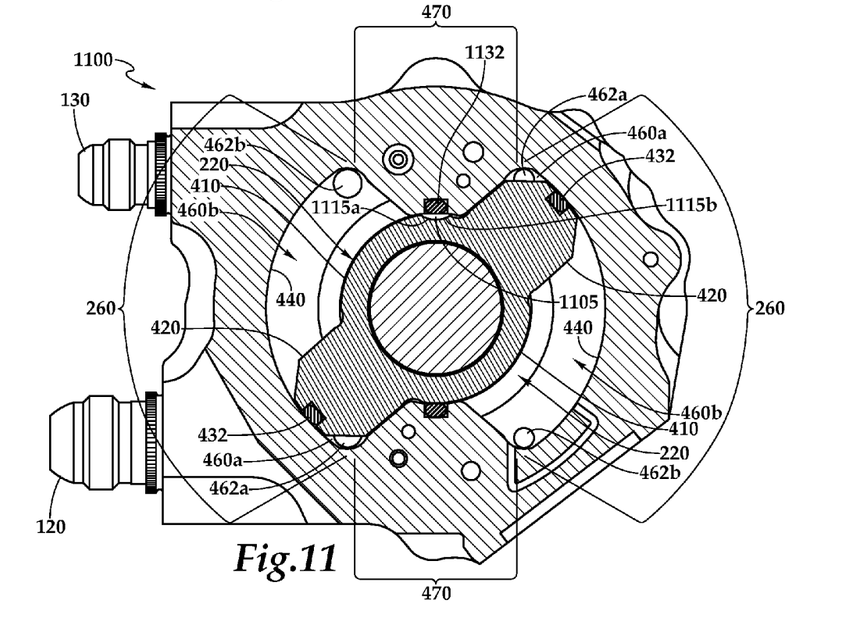
FIG. 11 is a cross sectional top view of another rotary actuator with variable cooling flow.

FIG. 11 is a cross sectional top view of another example rotary actuator 1100. The actuator 1100 is a modification of the example actuator 100 that includes a cooling channel 1105 that performs substantially the same function as the cooling path 614 of FIGS. 6A and 6B. The cooling channel 1105 is a groove formed circumferentially along a predetermined portion of the rotor 410. The length and position of the cooling channel 1105 are selected such that both ends 1115a, 1115b of the cooling channel 1105 are both on one side of a stator seal 1132 when the rotor vane 420 is rotated at least a predetermined distance from the stator vane 470, and such that the cooling channel 1105 extends beyond both sides of the stator seal 1132 when the rotor assembly 220 rotates the rotor vane 420 within a predefined arc, as shown in FIG. 11. In some implementations, the cooling channel 1105 can be located along the rotor 410 such that the ends 1115a, 1115b of the cooling channel 1105 extend beyond both sides of the stator seal 1132 when the rotor assembly 220 is at or near a hard stop position, such as when the rotor vane 440 contacts the stator vane 470.

Figure 12:
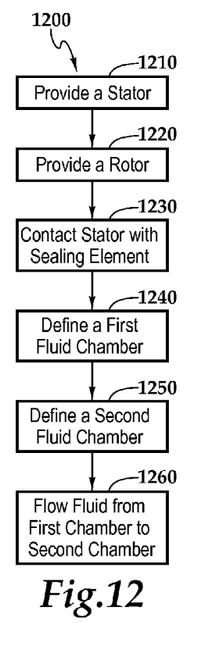
FIG. 12 is a flow diagram of an example method for using a rotary actuator with variable cooling flow.

FIG. 12 is a flow diagram of an example method 1200 for using a rotary actuator with variable cooling flow. In various embodiments, the method 1200 can be used with any of the rotary actuators 100, 800, 900, 1000, or 1100.

The method 1200 begins by providing a stator having at least one stator vane projecting from an inner circumferential surface of a central chamber of the stator, a first aperture at a first circumferential location in the stator, and a second aperture at a second circumferential location in the stator different from the first circumferential location and in fluidic communication with the first aperture at block 1210. For example, the stator assembly 210 of FIG. 2 may be provided.

At block 1220, a rotor is provided. The rotor has at least one rotor vane projecting from a central rotatable longitudinal shaft, said rotor rotatably disposed in the stator, said rotor vane including a sealing element disposed on a distal end of the rotor vane. For example, the rotor assembly 410 of FIG. 4 is provided.

At block 1230, the inner circumferential surface of the stator is contacted with the sealing element at a third circumferential location between the first circumferential location and the second circumferential location. For example, the seal 432 can contact the inner wall 440. At block 1240, a first fluid chamber is defined with the stator, the sealing element, and a first side of the rotor vane. For example, the fluid chamber 460b can be defined between the stator assembly 210, the seal 432, and the rotor vane 420. At block 1250, a second fluid chamber is defined with the stator, the sealing element, and a second side of the rotor vane. For example, the fluid chamber 460a can be defined between the stator assembly 210, the seal 432, and the rotor vane 420.

At block 1260 a fluid is flowed from the first fluid chamber through the first aperture to the second aperture to the second fluid chamber. For example, fluid from the fluid chamber 460b, out the cooling port 510 to the cooling port 512, and to the fluid chamber 460a.

In some implementations, the rotor can be rotated, the inner circumferential surface of the stator can be contacted with the sealing element at a fourth circumferential location not between the first circumferential location and the second circumferential location, and the fluid can be stopped from flowing through the first aperture and the second aperture. For example, FIG. 5A depicts the seal 432 in contact with the inner wall 440 at a location not between the cooling port 510 to the cooling port 512.

In some implementations, fluidic communication between the first aperture and the second aperture can be provided by a fluid flow passage comprising a gap between an outer surface of the stator and a housing of the actuator. For example, fluid can flow from the cooling port 842 to the cooling port 840b along the fluid channel 820 of FIG. 8.

In some implementations, fluidic communication between the first aperture and the second aperture can be provided by a fluid flow passage comprising a groove in an outer surface of the stator. In some implementations, fluidic communication between the first aperture and the second aperture can be provided by a fluid flow passage comprising a groove in an inner surface of the housing adjacent to the stator. In some implementations, fluidic communication between the first aperture and the second aperture can be provided by a fluid flow passage comprising a gap between the distal end of the rotary vane and the inner circumferential wall of the stator. For example, fluid can flow from the end 615b to the end 615a through the cooling channel 614 of FIG. 6B. In some implementations, fluidic communication between the first aperture and the second aperture is provided by a fluid flow passage comprising a bore in the stator or the housing.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A rotary vane actuator comprising:
a stator having at least one vane stop projecting from an inner circumferential surface of a central chamber of the stator, and a first fluid port and a second fluid port defined in an interior wall of the stator; and
a rotor having at least one vane projecting from a central rotatable longitudinal shaft, said rotor rotatably disposed in the stator, said vane including a sealing element disposed on a distal end of the vane and said sealing element adapted to contact the inner circumferential surface of the stator;
wherein said vane is adapted to contact said stop of the stator, and a high pressure chamber is defined by the stator and a first side of the vane and a low pressure chamber is defined by the stator and a second side of the vane;
wherein said actuator further includes at least a first aperture spaced apart from the first fluid port and the second fluid port, and said actuator further includes at least a second aperture and spaced apart from the first fluid port and the second fluid port; and
wherein a fluid flow passage comprising a gap between an outer surface of the stator and a housing of the actuator connects the first aperture to the second aperture; wherein the fluid flow passage and first and second apertures connect the high pressure chamber to the low pressure chamber when said vane is proximal to contact with said stop of the stator.

2. A rotary vane actuator comprising:
a stator having at least one vane stop projecting from an inner circumferential surface of a central chamber of the stator, and a first fluid port and a second fluid port defined in an interior wall of the stator; and
a rotor having at least one vane projecting from a central rotatable longitudinal shaft, said rotor rotatably disposed in the stator, said vane including a sealing element disposed on a distal end of the vane and said sealing element adapted to contact the inner circumferential surface of the stator;
wherein said vane is adapted to contact said stop of the stator, and a high pressure chamber is defined by the stator and a first side of the vane and a low pressure chamber is defined by the stator and a second side of the vane;
wherein said actuator further includes at least a first aperture spaced apart from the first fluid port and the second fluid port, and said actuator further includes at least a second aperture and spaced apart from the first fluid port and the second fluid port; and
wherein a fluid flow passage comprising a groove in an outer surface of the stator connects the first aperture to the second aperture; wherein the fluid flow passage and first and second apertures connect the high pressure chamber to the low pressure chamber when said vane is proximal to contact with said stop of the stator.

3. A rotary vane actuator comprising:
a housing having a bore;
a stator disposed within the bore and having at least one vane stop projecting from an inner circumferential surface of a central chamber of the stator, and a first fluid port and a second fluid port defined in an interior wall of the stator; and a rotor having at least one vane projecting from a central rotatable longitudinal shaft, said rotor rotatably disposed in the stator, said vane including a sealing element disposed on a distal end of the vane and said sealing element adapted to contact the inner circumferential surface of the stator;

wherein said vane is adapted to contact said stop of the stator, and a high pressure chamber is defined by the stator and a first side of the vane and a low pressure chamber is defined by the stator and a second side of the vane;

wherein said actuator further includes at least a first aperture spaced apart from the first fluid port and the second fluid port, and said actuator further includes at least a second aperture and spaced apart from the first fluid port and the second fluid port; and wherein a fluid flow passage comprising a groove in an inner surface of the housing adjacent to the stator connects the first aperture to the second aperture; wherein the fluid flow passage and first and second apertures connect the high pressure chamber to the low pressure chamber when said vane is proximal to contact with said stop of the stator.

4. A rotary vane actuator comprising:

a stator having at least one vane stop projecting from an inner circumferential surface of a central chamber of the stator, and a first fluid port and a second fluid port defined in an interior wall of the stator; and a rotor having at least one vane projecting from a central rotatable longitudinal shaft, said rotor rotatably disposed in the stator, said vane including a sealing element disposed on a distal end of the vane and said sealing element adapted to contact the inner circumferential surface of the stator;

wherein said vane is adapted to contact said stop of the stator, and a high pressure chamber is defined by the stator and a first side of the vane and a low pressure chamber is defined by the stator and a second side of the vane;

wherein said actuator further includes at least a first aperture spaced apart from the first fluid port and the second fluid port, and said actuator further includes at least a second aperture and spaced apart from the first fluid port and the second fluid port; and wherein a fluid flow passage comprising a groove in the central rotatable longitudinal shaft adjacent to the vane connects the first aperture to the second aperture; wherein the fluid flow passage and first and second apertures connect the high pressure chamber to the low pressure chamber when said vane is proximal to contact with said stop of the stator.

5. A method of cooling fluid flow for a rotary vane actuator comprising:

providing a stator having at least one stator vane projecting from an inner circumferential surface of a central chamber of the stator, and a first fluid port and a second fluid port defined in an interior wall of the stator;

providing a rotor having at least one rotor vane projecting from a central rotatable longitudinal shaft, said rotor rotatably disposed in the stator, said rotor vane including a sealing element disposed on a distal end of the rotor vane;

defining a first fluid chamber with the stator, the sealing element, and a first side of the rotor vane;

defining a second fluid chamber with the stator, the sealing element, and a second side of the rotor vane;

defining a first aperture at a first circumferential location spaced apart from the first fluid port and the second fluid port, and a second aperture, in fluid communication with the first aperture, at a second circumferential location different from the first circumferential location spaced apart from the first fluid port and the second fluid port;

contacting the inner circumferential surface of the stator with the sealing element at a third circumferential location between the first circumferential location and the second circumferential location; and flowing a fluid from the first fluid port to the first aperture through the first fluid chamber, to the second aperture, and to the second fluid port through the second fluid chamber, wherein fluidic communication between the first aperture and the second aperture is provided by a fluid flow passage comprising a gap between an outer surface of the stator and a housing of the actuator.

6. A method of cooling fluid flow for a rotary vane actuator comprising:

providing a stator having at least one stator vane projecting from an inner circumferential surface of a central chamber of the stator, and a first fluid port and a second fluid port defined in an interior wall of the stator;

providing a rotor having at least one rotor vane projecting from a central rotatable longitudinal shaft, said rotor rotatably disposed in the stator, said rotor vane including a sealing element disposed on a distal end of the rotor vane;

defining a first fluid chamber with the stator, the sealing element, and a first side of the rotor vane;

defining a second fluid chamber with the stator, the sealing element, and a second side of the rotor vane;

defining a first aperture at a first circumferential location spaced apart from the first fluid port and the second fluid port, and a second aperture, in fluid communication with the first aperture, at a second circumferential location different from the first circumferential location spaced apart from the first fluid port and the second fluid;

contacting the inner circumferential surface of the stator with the sealing element at a third circumferential location between the first circumferential location and the second circumferential location; and flowing a fluid from the first fluid port to the first aperture through the first fluid chamber, to the second aperture, and to the second fluid port through the second fluid chamber, wherein fluidic communication between the first aperture and the second aperture is provided by a fluid flow passage comprising a groove in an outer surface of the stator.

7. A method of cooling fluid flow for a rotary vane actuator comprising:

providing a housing having a bore;

providing a stator disposed within the bore and having at least one stator vane projecting from an inner circumferential surface of a central chamber of the stator, and a first fluid port and a second fluid port defined in an interior wall of the stator;

providing a rotor having at least one rotor vane projecting from a central rotatable longitudinal shaft, said rotor rotatably disposed in the stator, said rotor vane including a sealing element disposed on a distal end of the rotor vane;

defining a first fluid chamber with the stator, the sealing element, and a first side of the rotor vane;

defining a second fluid chamber with the stator, the sealing element, and a second side of the rotor vane;

defining a first aperture at a first circumferential location spaced apart from the first fluid port and the second fluid port, and a second aperture, in fluid communication with the first aperture, at a second circumferential location different from the first circumferential location spaced apart from the first fluid port and the second fluid port;

contacting the inner circumferential surface of the stator with the sealing element at a third circumferential location between the first circumferential location and the second circumferential location; and flowing a fluid from the first fluid port to the first aperture through the first fluid chamber, to the second aperture, and to the second fluid port through the second fluid chamber, wherein fluidic communication between the first aperture and the second aperture is provided by a fluid flow passage comprising a groove in an inner surface of the housing adjacent to the stator.

8. A method of cooling fluid flow for a rotary vane actuator comprising:

providing a stator having at least one stator vane projecting from an inner circumferential surface of a central chamber of the stator, and a first fluid port and a second fluid port defined in an interior wall of the stator;

providing a rotor having at least one rotor vane projecting from a central rotatable longitudinal shaft, said rotor rotatably disposed in the stator, said rotor vane including a sealing element disposed on a distal end of the rotor vane;

defining a first fluid chamber with the stator, the sealing element, and a first side of the rotor vane;

defining a second fluid chamber with the stator, the sealing element, and a second side of the rotor vane;

defining a first aperture at a first circumferential location spaced apart from the first fluid port and the second fluid port, and a second aperture, in fluid communication with the first aperture, at a second circumferential location different from the first circumferential location spaced apart from the first fluid port and the second fluid port;

contacting the inner circumferential surface of the stator with the sealing element at a third circumferential location between the first circumferential location and the second circumferential location; and flowing a fluid from the first fluid port to the first aperture through the first fluid chamber, to the second aperture, and to the second fluid port through the second fluid chamber, wherein fluidic communication between the first aperture and the second aperture is provided by a fluid flow passage comprising a groove in the central rotatable longitudinal shaft adjacent to the vane.

9. A method of cooling fluid flow for a rotary vane actuator comprising:

providing a stator having at least one stator vane projecting from an inner circumferential surface of a central chamber of the stator, and a first fluid port and a second fluid port defined in an interior wall of the stator;

providing a rotor having at least one rotor vane projecting from a central rotatable longitudinal shaft, said rotor rotatably disposed in the stator, said rotor vane including a sealing element disposed on a distal end of the rotor vane;

defining a first fluid chamber with the stator, the sealing element, and a first side of the rotor vane;

defining a second fluid chamber with the stator, the sealing element, and a second side of the rotor vane;

defining a first aperture at a first circumferential location spaced apart from the first fluid port and the second fluid port, and a second aperture at a second circumferential location different from the first circumferential location spaced apart from the first fluid port and the second fluid port and in fluidic communication with the first aperture;

contacting at least a portion of the inner circumferential surface of the stator with the sealing element at a third circumferential location between the first circumferential location and the second circumferential location; and flowing a fluid from the first fluid port to the first aperture through the first fluid chamber, to the second aperture, and to the second fluid port through the second fluid chamber, wherein fluidic communication between the first aperture and the second aperture is provided by a fluid flow passage comprising a gap between the distal end of the rotary vane and the inner circumferential surface of the stator.

10. A method of cooling fluid flow for a rotary vane actuator comprising:

providing a stator having at least one stator vane projecting from an inner circumferential surface of a central chamber of the stator, and a first fluid port and a second fluid port defined in an interior wall of the stator;

providing a rotor having at least one rotor vane projecting from a central rotatable longitudinal shaft, said rotor rotatably disposed in the stator, said rotor vane including a sealing element disposed on a distal end of the rotor vane;

defining a first fluid chamber with the stator, the sealing element, and a first side of the rotor vane;

defining a second fluid chamber with the stator, the sealing element, and a second side of the rotor vane;

defining a first aperture at a first circumferential location spaced apart from the first fluid port and the second fluid port, and a second aperture at a second circumferential location different from the first circumferential location spaced apart from the first fluid port and the second fluid port and in fluidic communication with the first aperture;

contacting at least a portion of the interior wall of the stator with the sealing element at a third circumferential location between the first circumferential location and the second circumferential location; and flowing a fluid from the first fluid port to the first aperture through the first fluid chamber, to the second aperture, and to the second fluid port through the second fluid chamber, wherein fluidic communication between the first aperture and the second aperture is provided by a fluid flow passage comprising a gap between the interior wall of the stator and the sealing element.

* * * * *